United States Patent
Willard

(10) Patent No.: US 7,063,371 B2
(45) Date of Patent: Jun. 20, 2006

(54) CONVERTIBLE HARDTOP ROOF

(75) Inventor: Michael T. Willard, Harrison Township, MI (US)

(73) Assignee: ASC Incorporated, Southgate, MI (US)

(*) Notice: Subject to any disclaimer, the term of this patent is extended or adjusted under 35 U.S.C. 154(b) by 54 days.

(21) Appl. No.: 10/800,118

(22) Filed: Mar. 12, 2004

(65) Prior Publication Data
US 2005/0200158 A1    Sep. 15, 2005

(51) Int. Cl.
*B60J 7/08* (2006.01)

(52) U.S. Cl. .................... 296/107.17; 296/108

(58) Field of Classification Search .......... 296/107.17, 296/107.18, 108
See application file for complete search history.

(56) References Cited

U.S. PATENT DOCUMENTS

| | | |
|---|---|---|
| 404,405 A | 6/1889 | Haughey |
| 1,056,333 A | 9/1913 | Hill |
| 1,174,366 A | 3/1916 | Van Den Plas |
| 1,184,734 A | 5/1916 | Freeman |
| 1,269,311 A | 6/1918 | Rixon |
| 1,784,279 A | 12/1930 | Ellerbeck |
| 1,831,494 A | 11/1931 | Hynes et al. |
| 1,856,531 A | 5/1932 | Berg |
| 1,892,512 A | 12/1932 | Kemp |
| 1,905,814 A | 4/1933 | Orlow |
| 1,929,371 A | 10/1933 | Hamilton |
| 1,988,346 A | 1/1935 | Wagner |
| 2,007,873 A | 7/1935 | Paulin |
| 2,076,243 A | 4/1937 | Marshall et al. |
| 2,201,330 A | 5/1940 | Wernig et al. |
| 2,303,789 A | 12/1942 | Carr |
| 2,360,524 A | 10/1944 | Simpson |
| 2,372,583 A | 3/1945 | Keller |
| 2,468,251 A | 4/1949 | Wiederman |
| 2,486,905 A | 11/1949 | Ackermans |
| 2,560,459 A | 7/1951 | Lundbert et al. |
| 2,564,446 A | 8/1951 | Parsons |
| 2,570,260 A | 10/1951 | Milhan |
| 2,570,261 A | 10/1951 | Milhan |

(Continued)

FOREIGN PATENT DOCUMENTS

BE    493260    5/1950

(Continued)

OTHER PUBLICATIONS

Alfa Romeo Proteo Or Alfa Romeo 164 Proteo / 1991 (believed to have been offered for sale, publicly used, and/or published prior to the filing date of this application).

(Continued)

*Primary Examiner*—Joseph D. Pape
(74) *Attorney, Agent, or Firm*—Harness, Dickey & Pierce, P.L.C.

(57) ABSTRACT

A hardtop convertible roof for a vehicle includes rigid panels that are interconnected to one another to selectively cover the passenger compartment. The roof panels rearward of a forwardmost roof panel are directly pivotally connected to a single pair of brackets which are fixedly connected to opposite sides of the vehicle. An interior surface of a third roof panel faces a majority of an exterior surface of a second roof panel when the roof panels are in a stowed position. The rearmost two roof panels form an at least four-bar linkage and a moveable link interconnecting the two panels is positioned between the majority of portions of the rearmost panels and the pivotal connections of these panels to a fixed location.

20 Claims, 4 Drawing Sheets

U.S. PATENT DOCUMENTS

| | | |
|---|---|---|
| 2,580,486 A | 1/1952 | Vigmostad |
| 2,596,355 A | 5/1952 | Ackermans |
| 2,674,480 A | 4/1954 | Vigmostad |
| 2,704,225 A | 3/1955 | Anschuetz et al. |
| 2,709,621 A | 5/1955 | Votypka et al. |
| 2,747,928 A | 5/1956 | Olivier et al. |
| 2,753,202 A | 7/1956 | Smith et al. |
| 2,768,024 A | 10/1956 | Spear, Jr. |
| 2,768,025 A | 10/1956 | Spear, Jr. et al. |
| 2,785,914 A | 3/1957 | Thomas et al. |
| RE24,375 E | 4/1957 | Thompson, III |
| 2,831,718 A | 4/1958 | Hallek et al. |
| 2,841,441 A | 7/1958 | Evans |
| 2,852,292 A | 9/1958 | Galla |
| 2,856,231 A | 10/1958 | Zeman |
| 2,869,923 A | 1/1959 | Mulichak |
| 2,879,988 A | 3/1959 | Klisch |
| 2,886,364 A | 5/1959 | Smith |
| 2,916,327 A | 12/1959 | Gilson |
| 2,919,156 A | 12/1959 | Dodge |
| 2,926,943 A | 3/1960 | Leslie et al. |
| 2,935,350 A | 5/1960 | Bestrom |
| 2,939,742 A | 6/1960 | Dardarian et al. |
| 2,997,337 A | 8/1961 | Day et al. |
| 3,004,788 A | 10/1961 | Dully et al. |
| 3,059,962 A | 10/1962 | Harms et al. |
| 3,089,719 A | 5/1963 | Csizmansy |
| 3,135,541 A | 6/1964 | Kwasek |
| 3,151,375 A | 10/1964 | Schevenell |
| 3,154,341 A | 10/1964 | Booth |
| 3,172,695 A | 3/1965 | Bordinat, Jr. |
| 3,266,838 A | 8/1966 | Heincelman |
| 3,353,864 A | 11/1967 | Antaya et al. |
| 3,357,738 A | 12/1967 | Bourlier |
| 3,362,740 A | 1/1968 | Burns |
| 3,375,037 A | 3/1968 | Hunt, Jr. |
| 3,377,099 A | 4/1968 | Podolan |
| 3,400,526 A | 9/1968 | Bloss |
| 3,425,742 A | 2/1969 | Rauber, Jr. |
| 3,443,834 A | 5/1969 | Andres |
| 3,575,464 A | 4/1971 | Himka et al. |
| 3,586,360 A | 6/1971 | Perotta |
| 3,712,665 A | 1/1973 | Klein |
| 3,751,949 A | 8/1973 | Castle |
| 3,845,976 A | 11/1974 | Peterson |
| 3,891,252 A | 6/1975 | Lehmann |
| 3,994,524 A | 11/1976 | Lehmann |
| 4,168,859 A | 9/1979 | Breitschwerdt et al. |
| 4,439,649 A | 3/1984 | Cecchi |
| 4,441,345 A | 4/1984 | Guarr |
| 4,470,277 A | 9/1984 | Uyeda |
| 4,537,440 A | 8/1985 | Brockway et al. |
| 4,573,732 A | 3/1986 | Muscat |
| 4,618,180 A | 10/1986 | Muscat |
| 4,634,171 A | 1/1987 | McKeag |
| 4,664,436 A | 5/1987 | Eyb |
| 4,702,505 A | 10/1987 | Alexander |
| 4,711,485 A | 12/1987 | Maebayashi et al. |
| 4,712,828 A | 12/1987 | Albrecht |
| 4,720,133 A | 1/1988 | Alexander et al. |
| 4,729,592 A | 3/1988 | Tuchiya et al. |
| 4,746,163 A | 5/1988 | Muscat |
| 4,776,630 A | 10/1988 | Fukutomi et al. |
| 4,787,675 A | 11/1988 | McLeod |
| 4,796,943 A | 1/1989 | Fukutomi et al. |
| 4,801,173 A | 1/1989 | Trenkler |
| 4,815,775 A | 3/1989 | Mertin et al. |
| 4,817,999 A | 4/1989 | Drew |
| 4,819,983 A | 4/1989 | Alexander et al. |
| 4,830,425 A | 5/1989 | Muscat |
| 4,830,426 A | 5/1989 | Schlachter et al. |
| 4,852,935 A | 8/1989 | Varner |
| 4,854,634 A | 8/1989 | Shiraishi et al. |
| 4,895,409 A | 1/1990 | Konishi et al. |
| 4,950,022 A | 8/1990 | Pattee |
| 4,958,882 A | 9/1990 | Kolb |
| 5,029,932 A | 7/1991 | Parr |
| 5,033,789 A | 7/1991 | Hayashi et al. |
| 5,035,461 A | 7/1991 | Zweigart |
| 5,035,463 A | 7/1991 | Kato et al. |
| 5,042,869 A | 8/1991 | Brin |
| 5,046,767 A | 9/1991 | Muscat |
| 5,052,740 A | 10/1991 | Bauer et al. |
| 5,058,939 A | 10/1991 | Miilu |
| 5,064,241 A | 11/1991 | Ohrle |
| 5,067,768 A | 11/1991 | Fischbach |
| 5,078,447 A | 1/1992 | Klein et al. |
| 5,085,483 A | 2/1992 | Alexander |
| 5,088,777 A | 2/1992 | Ono et al. |
| 5,090,764 A | 2/1992 | Kogawa et al. |
| 5,154,479 A | 10/1992 | Sautter, Jr. |
| 5,161,852 A | 11/1992 | Alexander et al. |
| 5,186,516 A | 2/1993 | Alexander et al. |
| 5,195,798 A | 3/1993 | Klein et al. |
| 5,207,474 A | 5/1993 | Licher et al. |
| 5,209,544 A | 5/1993 | Benedetto et al. |
| 5,225,747 A | 7/1993 | Helms et al. |
| 5,267,769 A | 12/1993 | Bonne et al. |
| 5,269,586 A | 12/1993 | Hahn et al. |
| 5,284,378 A | 2/1994 | Sautter, Jr. |
| 5,301,987 A | 4/1994 | Tokarz et al. |
| 5,328,229 A | 7/1994 | Brandt et al. |
| 5,413,390 A | 5/1995 | Filippi |
| 5,429,400 A | 7/1995 | Kawaguchi et al. |
| 5,429,409 A | 7/1995 | Corder et al. |
| 5,435,615 A | 7/1995 | Schmitz |
| 5,451,849 A | 9/1995 | Porter et al. |
| 5,489,146 A | 2/1996 | Fischbach |
| 5,490,709 A | 2/1996 | Rahn |
| 5,520,432 A | 5/1996 | Gmeiner et al. |
| 5,533,777 A | 7/1996 | Kleemann et al. |
| 5,542,735 A | 8/1996 | Fürst et al. |
| 5,593,202 A | 1/1997 | Corder et al. |
| 5,595,407 A | 1/1997 | ter Horst et al. |
| 5,620,226 A | 4/1997 | Sautter, Jr. |
| 5,624,149 A | 4/1997 | Tokarz |
| 5,645,309 A | 7/1997 | Graf |
| 5,647,630 A | 7/1997 | Jambor et al. |
| 5,649,733 A | 7/1997 | Seel et al. |
| 5,678,881 A | 10/1997 | Tokarz |
| 5,722,704 A | 3/1998 | Chaput et al. |
| 5,743,587 A | 4/1998 | Alexander et al. |
| 5,755,467 A | 5/1998 | Dilluvio et al. |
| 5,769,483 A | 6/1998 | Danzl et al. |
| 5,772,274 A | 6/1998 | Tokarz |
| 5,772,275 A | 6/1998 | Tokarz |
| 5,785,375 A | 7/1998 | Alexander et al. |
| 5,806,912 A | 9/1998 | Ramaciotti et al. |
| D406,792 S | 3/1999 | Alexander et al. |
| 5,904,394 A | 5/1999 | Dilluvio et al. |
| 5,975,620 A | 11/1999 | Jambor et al. |
| 5,979,970 A | 11/1999 | Rothe et al. |
| 5,988,729 A | 11/1999 | Klein |
| 6,007,143 A | 12/1999 | Lehmann et al. |
| 6,010,178 A | 1/2000 | Hahn et al. |
| 6,019,416 A | 2/2000 | Beierl |
| 6,030,023 A | 2/2000 | Guillez |
| 6,033,008 A | 3/2000 | Mattila |
| 6,033,009 A | 3/2000 | Ritter et al. |
| 6,039,382 A | 3/2000 | Mather et al. |
| 6,039,383 A | 3/2000 | Jambor et al. |
| 6,042,174 A | 3/2000 | Durrani |
| 6,053,560 A | 4/2000 | Rothe |
| 6,062,625 A | 5/2000 | Elelnrieder et al. |

| | | |
|---|---|---|
| D427,138 S | 6/2000 | Alexander et al. |
| 6,155,614 A | 12/2000 | Lange |
| 6,158,786 A | 12/2000 | Droste et al. |
| 6,168,224 B1 | 1/2001 | Henn et al. |
| 6,182,527 B1 | 2/2001 | Sander |
| 6,213,534 B1 | 4/2001 | MacFarland |
| 6,217,104 B1 | 4/2001 | Neubrand |
| D442,541 S | 5/2001 | Alexander et al. |
| 6,227,604 B1 | 5/2001 | Grace |
| 6,273,492 B1 | 8/2001 | Schroder et al. |
| 6,283,532 B1 | 9/2001 | Neubrand |
| 6,299,234 B1 | 10/2001 | Seel et al. |
| 6,305,737 B1 | 10/2001 | Corder et al. |
| 6,312,041 B1 | 11/2001 | Queveau et al. |
| 6,312,042 B1 | 11/2001 | Halbweiss et al. |
| 6,315,349 B1 | 11/2001 | Kinnanen |
| 6,318,793 B1 | 11/2001 | Rapin et al. |
| 6,325,446 B1 | 12/2001 | Wuellrich et al. |
| 6,328,372 B1 | 12/2001 | Just |
| 6,334,644 B1 | 1/2002 | Gurtler et al. |
| 6,336,673 B1 * | 1/2002 | Rothe et al. ............ 296/107.17 |
| 6,347,828 B1 | 2/2002 | Rapin et al. |
| 6,390,532 B1 | 5/2002 | MacFarland |
| 6,419,296 B1 | 7/2002 | Dintner et al. |
| 6,419,297 B1 | 7/2002 | Haberl et al. |
| 6,422,637 B1 | 7/2002 | MacFarland |
| 6,425,622 B1 | 7/2002 | Eberle |
| 6,467,832 B1 | 10/2002 | Schutt et al. |
| 6,478,362 B1 | 11/2002 | Obendiek |
| 6,497,446 B1 | 12/2002 | Obendiek |
| 6,497,447 B1 | 12/2002 | Willard |
| 6,502,891 B1 | 1/2003 | Russke |
| 6,502,892 B1 | 1/2003 | Eberle |
| 6,505,881 B1 | 1/2003 | Kinnanen |
| 6,508,502 B1 | 1/2003 | Willard |
| 6,520,560 B1 | 2/2003 | Schutt et al. |
| 6,572,175 B1 | 6/2003 | Schutt et al. |
| 6,592,169 B1 | 7/2003 | Obendick |
| 6,604,775 B1 | 8/2003 | Obendiek |
| 6,637,802 B1 | 10/2003 | Obendiek |
| 6,648,397 B1 | 11/2003 | Schutt et al. |
| 6,659,534 B1 | 12/2003 | Willard |
| 6,666,495 B1 | 12/2003 | Nania |
| 6,682,125 B1 | 1/2004 | Guillez et al. |
| 6,695,386 B1 | 2/2004 | Willard |
| 6,736,444 B1 | 5/2004 | Reinsch |
| 6,736,445 B1 | 5/2004 | Obendiek |
| 6,767,044 B1 | 7/2004 | Tohda et al. |
| 6,767,045 B1 | 7/2004 | Reinsch |
| 6,820,917 B1 | 11/2004 | Grubbs |
| 6,830,284 B1 * | 12/2004 | Guillez et al. .............. 296/108 |
| 6,866,324 B1 | 3/2005 | Neubrand et al. |
| 2001/0045749 A1 | 11/2001 | Russke |
| 2002/0185886 A1 * | 12/2002 | Obendiek .................. 296/108 |
| 2003/0042751 A1 | 3/2003 | Antreich |
| 2004/0094988 A1 | 5/2004 | Doncov et al. |
| 2004/0174039 A1 * | 9/2004 | Dilluvio ................ 296/107.17 |

FOREIGN PATENT DOCUMENTS

| | | |
|---|---|---|
| CH | 650980 | 8/1985 |
| DE | 646381 | 5/1937 |
| DE | 1505474 | 7/1969 |
| DE | 1505721 | 7/1970 |
| DE | 1755619 | 8/1971 |
| DE | 3416286 | 10/1984 |
| DE | 3635373 | 4/1988 |
| DE | 3635887 | 5/1988 |
| DE | 3733892 | 4/1989 |
| DE | 3816060 | 11/1989 |
| DE | 9108242 | 11/1992 |
| DE | 4316485 | 11/1994 |
| DE | 4320603 | 1/1995 |
| DE | 4324708 | 1/1995 |
| DE | 4438191 | 7/1995 |
| DE | 4438190 | 11/1995 |
| DE | 4431656 | 12/1995 |
| DE | 4445580 | 12/1995 |
| DE | 4445941 | 3/1996 |
| DE | 4445944 | 4/1996 |
| DE | 4446483 | 6/1996 |
| DE | 19517063 | 6/1996 |
| DE | 4445920 | 7/1996 |
| DE | 19514022 | 9/1996 |
| DE | 4415969 | 11/1996 |
| DE | 19518071 | 11/1996 |
| DE | 19532568 | 11/1996 |
| DE | 19532567 | 12/1996 |
| EP | 805229 | 5/1951 |
| EP | 0188774 | 12/1985 |
| EP | 0261379 | 3/1988 |
| EP | 0429006 | 7/1992 |
| EP | 0494366 | 7/1992 |
| FR | 1049026 | 12/1953 |
| FR | 2818931 | 7/2002 |
| GB | 352786 | 7/1931 |
| GB | 413467 | 7/1934 |
| GB | 536578 | 5/1941 |
| GB | 756531 | 9/1956 |
| GB | 978638 | 12/1964 |
| JP | 62120222 | 6/1987 |
| JP | 2144226 | 4/1990 |
| WO | WO96/27509 | 3/1996 |

OTHER PUBLICATIONS

Alfa Romeo Spider Rht/ 2001 (believed to have been offered for sale, publicly used, and/or published prior to the filing date of this application).

Audi Quattro Roadster / 1984-1987 (believed to have been offered for sale, publicly used, and/or published prior to the filing date of this application).

Automobil Revue, Sep. 5, 1991, cover page and p. 29 (including English translation).

Automotive Industries, Feb. 1990, p. 75, showing "C & C Intrigue".

Bentley Retractable Hardtop / 1999 (believed to have been offered for sale, publicly used, and/or published prior to the filing date of this application).

Bérard Roadster / 2001 (believed to have been offered for sale, publicly used, and/or published prior to the filing date of this application).

BMW Klapp Top / 2000 (believed to have been offered for sale, publicly used, and/or published prior to the filing date of this application).

BMW Oasys Vision / 2002 (believed to have been offered for sale, publicly used, and/or published prior to the filing date of this application).

Buick Blackhawk / 2000 (believed to have been offered for sale, publicly used, and/or published prior to the filing date of this application).

C&C Intrigue / 1990 (believed to have been offered for sale, publicly used, and/or published prior to the filing date of this application).

Cadillac Allanté Charisma / 1994 (believed to have been offered for sale, publicly used, and/or published prior to the filing date of this application).

Cadillac Evoq / 1999 (believed to have been offered for sale, publicly used, and/or published prior to the filing date of this application).

Cadillac XLR / 2003-200x (believed to have been offered for sale, publicly used, and/or published prior to the filing date of this application).
Car Styling 86, Jan. 1992, cover page and pp.64-67 (including English translation).
Chevrolet Corvette Retractable Hardtop / 1958 (believed to have been offered for sale, publicly used, and/or published prior to the filing date of this application).
Chevrolet SSR / 2000 (believed to have been offered for sale, publicly used, and/or published prior to the filing date of this application).
Chevrolet SSR / 2001-200x (believed to have been offered for sale, publicly used, and/or published prior to the filing date of this application).
Chrysler Dart / 1957 (believed to have been offered for sale, publicly used, and/or published prior to the filing date of this application).
Chrysler Phaeton / 1997 (believed to have been offered for sale, publicly used, and/or published prior to the filing date of this application).
Chrysler Thunderbolt / 1941 (believed to have been offered for sale, publicly used, and/or published prior to the filing date of this application).
Citroën 11 Légére / 1952 (believed to have been offered for sale, publicly used, and/or published prior to the filing date of this application).
Citroën 15 Six / 1950 (believed to have been offered for sale, publicly used, and/or published prior to the filing date of this application).
Daihatsu Kopen / 1999 (believed to have been offered for sale, publicly used, and/or published prior to the filing date of this application).
Daihatsu Kopen / 2001 (believed to have been offered for sale, publicly used, and/or published prior to the filing date of this application).
Edsel Retractable Hardtop / 1958 (believed to have been offered for sale, publicly used, and/or published prior to the filing date of this application).
Edsel Skyliner / 1958 (believed to have been offered for sale, publicly used, and/or published prior to the filing date of this application).
Ferrari Testarossa St. Tropez / 1992 (believed to have been offered for sale, publicly used, and/or published prior to the filing date of this application).
Fiat Punto Wish / 1999 (believed to have been offered for sale, publicly used, and/or published prior to the filing date of this application).
Ford Fairlane 500 Skyliner / 1957 (believed to have benn offered for sale, publicly used, and/or published prior to the filing date of this application).
Ford Fairlane 500 Skyliner / 1958 (believed to have been offered for sale, publicly used, and/or published prior to the filing date of this application).
Ford Focus Cabriolet Retractable Hardtop / 1999 (believed to have been offered for sale, publicly used, and/or published prior to the filing date of this application).
Ford Galaxie Skyliner / 1959 (believed to have been offered for sale, publicly used, and/or published prior to the filing date of this application).
Ford Mustang Restro-mod / 1964 (believed to have been offered for sale, publicly used, and/or published prior to the filing date of this application).
Ford Mustang Retractable Hardtop / 1964 (believed to have been offered for sale, publicly used, and/or published prior to the filing date of this application).
Ford Mustang Retractable Hardtop / 1966 (believed to have been offered for sale, publicly used, and/or published prior to the filing date of this application).
Gaylord Gladiator / 1955-1956 (believed to have been offered for sale, publicly used, and/or published prior to the filing date of this application).
Heuliez Hardtop Intruder / 1998 (believed to have been offered for sale, publicly used, and/or published prior to the filing date of this application).
Heuliez Raffica / 1992 (believed to have been offered for sale, publicly used, and/or published prior to the filing date of this application).
Heuliez Retractop 102001 (believed to have been offered for sale, publicly used, and/or published prior to the filing date of this application).
Heuliez Retractop 2 / 2000 (believed to have been offered for sale, publicly used, and/or published prior to the filing date of this application).
Honda Argento Vivo / 1995 (believed to have been offered for sale, publicly used, and/or published prior to the filing date of this application).
Hudson Super Six / 1922 (believed to have been offered for sale, publicly used, and/or published prior to the filing date of this application).
Hudson Super Six / 1923 (believed to have been offered for sale, publicly used, and/or published prior to the filing date of this application).
Introducing the Chevy SSR, Aug. 2002, 2 pages (and description of corresponding public use).
Isuzu VX-02 / 1999 (believed to have been offered for sale, publicly used, and/or published prior to the filing date of this application).
Karmann Coupé-Cabrio / 1999 (believed to have been offered for sale, publicly used, and/or published prior to the filing date of this application).
Keinath GT/R/ 1996-200x (believed to have been offered for sale, publicly used, and/or published prior to the filing date of this application).
Lada Roadster / 2000 (believed to have been offered for sale, publicly used, and/or published prior to the filing date of this application).
Lancia Belna Éclipse / 1934 (believed to have been offered for sale, publicly used, and/or published prior to the filing date of this application).
Lexus SC430 / 2000-200x (believed to have been offered for sale, publicly used, and/or published prior to the filing date of this application).
Lexus Sport Coupé / 1999 (believed to have been offered for sale, publicly used, and/or published prior to the filing date of this application).
Mercedes-Benz GLK / 1999 (believed to have been offered for sale, publicly used, and/or published prior to the filing date of this application).
Mercedes-Benz Magic Top / 1984-1987 (believed to have been offered for sale, publicly used, and/or published prior to the filing date of this application).
Mercedes-Benz SL / 2001-200x (believed to have been offered for sale, publicly used, and/or published prior to the filing date of this application).
Mercedes-Benz SLK Paris / 1994 (believed to have been offered for sale, publicly used, and/or published prior to the filing date of this application).
Mercedes-Benz SLK/ 1996-200x (believed to have been offered for sale, publicly used, and/or published prior to the filing date of this application).

Michalak Corsaspider / 1984-1988 (believed to have been offered for sale, publicly used, and/or published prior to the filing date of this application).
Mitsubishi 3000 GT Spyder / 1994-1996 (believed to have been offered for sale, publicly used, and/or published prior to the filing date of this application).
Mitsubishi Colt Aiolia / 1988 (believed to have been offered for sale, publicly used, and/or published prior to the filing date of this application).
Mohs Safarikar / 1972-1975 (believed to have been offered for sale, publicly used, and/or published prior to the filing date of this application).
Nissan 300 ZX / 1992 (believed to have been offered for sale, publicly used, and/or published prior to the filing date of this application).
Nissan Luc-2 / 1985 (believed to have been offered for sale, publicly used, and/or published prior to the filing date of this application).
Nissan Micra C+C / 2002 (believed to have been offered for sale, publicly used, and/or published prior to the filing date of this application).
Nissan Silvia Varietta / 1999 (believed to have been offered for sale, publicly used, and/or published prior to the filing date of this application).
Oldsmobile F-88 MK3 / 1959 (believed to have been offered for sale, publicly used, and/or published prior to the filing date of this application).
Opel Coupé Roadster / 2004-200x (believed to have been offered for sale, publicly used, and/or published prior to the filing date of this application).
Paxton / 1951 (believed to have been offered for sale, publicly used, and/or published prior to the filing date of this application).
Peugeot 106 Spider / 1992 (believed to have been offered for sale, publicly used, and/or published prior to the filing date of this application).
Peugeot 20 / 1998 (believed to have been offered for sale, publicly used, and/or published prior to the filing date of this application).
Peugeot 202 Éclipse / 1938 (believed to have been offered for sale, publicly used, and/or published prior to the filing date of this application).
Peugeot 206 CC / 2000-200x (believed to have been offered for sale, publicly used, and/or published prior to the filing date of this application).
Peugeot 206 CC Ciel Bleu / 2001 (believed to have been offered for sale, publicly used, and/or published prior to the filing date of this application).
Peugeot 301 Éclipse / 1934 (believed to have been offered for sale, publicly used, and/or published prior to the filing date of this application).
Peugeot 37 CC / 2002 (believed to have been offered for sale, publicly used, and/or published prior to the filing date of this application).
Peugeot 401d Éclipse / 1934-1935 (believed to have been offered for sale, publicly used, and/or published prior to the filing date of this application).
Peugeot 402 Éclipse Électrique / 1935-1936 (believed to have been offered for sale, publicly used, and/or published prior to the filing date of this application).
Peugeot 402 Éclipse Mécanique / 1936-1938 (believed to have been offered for sale, publicly used, and/or published prior to the filing date of this application).
Peugeot 402b Éclipse Mécanique / 1938-1939 (believed to have been offered for sale, publicly used, and/or published prior to the filing date of this application).
Peugeot 601c Éclipse / 1934 (believed to have been offered for sale, publicly used, and/or published prior to the filing date of this application).
Peugeot 601d Éclipse / 1934-1935 (believed to have been offered for sale, publicly used, and/or published prior to the filing date of this application).
Peugeot 601dl Éclipse / 1934 (believed to have been offered for sale, publicly used, and/or published prior to the filing date of this application).
Peugeot 607 Paladine / 2000 (believed to have been offered for sale publicly used, and/or published prior to the filing date of this application).
Peugeot Crisalys / 1998 (believed to have been offered for sale, publicly used, and/or published prior to the filing date of this application).
Picture of 1957 Ford Fairlane retractable hardtop convertible, The Detroit News, Apr. 6, 1994.
Playboy / 1947-1951 (believed to have been offered for sale, publicly used, and/or published prior to the filing date of this application).
Scimitar Hard-Top Convertible / 1959 (believed to have been offered for sale, publicly used, and/or published prior to the filing date of this application).
Skyline X-50 / 1953 (believed to have been offered for sale, publicly used, and/or published prior to the filing date of this application).
Suzuki C2 / 1997 (believed to have been offered for sale, publicly used, and/or published prior to the filing date of this application).
Toyota MRJ / 1995 (believed to have been offered for sale, publicly used, and/or published prior to the filing date of this application).
Toyota Soarer / 2000-200x (believed to have been offered for sale, publicly used, and/or published prior to the filing date of this application).
Treser T1 / 1987-198x (believed to have been offered for sale, publicly used, and/or published prior to the filing date of this application).
Valmet Boreal / 1997 (believed to have been offered for sale, publicly used, and/or published prior to the filing date of this application).
Viper Pure Performance by Dodge/Auto Editors of Consumer Guide, Publications International Ltd., pp. 6-7, 1993.
Volvo C70 Coupé Convertible / 2002 (believed to have been offered for sale, publicly used, and/or published prior to the filing date of this application).
Volvo C70 Hatric / 2001 (believed to have been offered for sale, publicly used, and/or published prior to the filing date of this application).
Volvo Lowrider / 19xx (believed to have been offered for sale, publicly used, and/or published prior to the filing date of this application).

* cited by examiner

CONVERTIBLE HARDTOP ROOF

BACKGROUND AND SUMMARY OF THE INVENTION

The present invention relates to convertible roofs and more specifically to hardtop convertible roofs. Retractable roofs for convertible automotive vehicles presently exist. Examples of traditional hard-top convertible roofs are disclosed in the following patents: U.S. Pat. No. 6,347,828 entitled "Actuation Mechanism for a Two Piece Retractable Hard-Top Roof for an Automobile" which issued to Rapin et al. on Feb. 19, 2002; U.S. Pat. No. 6,318,793 entitled "Two Piece Retractable Hard-Top Roof for an Automobile" which issued to Rapin et al. on Nov. 20, 2001; and U.S. Pat. No. 5,979,970 entitled "Roof Assembly for a Convertible Vehicle" which issued to Rothe et al. on Nov. 9, 1999. These U.S. patents are incorporated by reference herein.

In another example, one retractable hard top roof employs a plurality of rigid roof panels which slide rearwardly over one another during retraction. Typically, these retracting roof panels are mechanically stowed in the trunk of the automotive vehicle. Unfortunately, this system does not fully retract flush within the vehicle body and occupies a relatively large storage space within the trunk.

Recently, various retractable roof systems have been developed with a rigid roof member which swings into a passenger compartment of the vehicle. These systems stow the retracted roof panels in a substantially vertical orientation behind either the front or rear seats. While these systems maintain storage space within the trunk, the retracted roof panels are often stored in an unsightly manner. Additionally, the vertical orientation of the retracted roof panels requires a relatively deep storage compartment. This orientation often precludes use of a retractable roof in vehicles having a usable cargo area such as sport utility vehicles and pick-up trucks. Therefore, it would be desirable to have a retractable hard top roof requiring a minimal packaging envelope to maximize storage space within the trunk or cargo area. To achieve this goal, multiple panels are stored in a substantially horizontal manner to minimize the depth of the required storage area.

In accordance with the present invention, a hard top convertible roof includes at least three separate and generally rigid panels interconnected to one another to selectively cover the passenger compartment of a vehicle. In another aspect of the present invention, each of the roof panels rearward of a forwardmost roof panel is directly pivotally connected to a single pair of brackets which are fixedly connected to opposite sides of the vehicle. In a further aspect of the present invention, the rearmost two roof panels define an at least-four bar linkage and a moveable link interconnecting the two panels is positioned between the majority portions of the rearmost panels and the pivotal connections of these panels to a fixed location. In still a further aspect of the present invention, an interior surface of a third roof panel faces a majority of an exterior surface of a second roof panel when the roof panels are in a stowed positioned. In yet another aspect of the present invention, a moveable link of an at least four-bar linkage interconnecting a rearmost two roof panels is driven by an actuator which causes the panels to move between raised and stowed positions.

The present invention is advantageous over traditional designs in that the roof panels are stacked in a substantionally horizontal manner which minimizes the packaging space required in both the fore-and-aft direction and the vertical direction. Furthermore, the present invention is advantageous because the roof sections may be retracted and stowed within the vehicle trunk so as to maintain the space within the vehicle passenger compartment. The convertible roof of the present invention may also be stowed in a roof storage compartment separated from the passenger compartment and a miscellaneous storage area or trunk.

The present invention also provides a self-covering feature in that when the convertible roof is in the stowed position, the uppermost stacked panel is oriented to display the outer finished surface of the panel. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
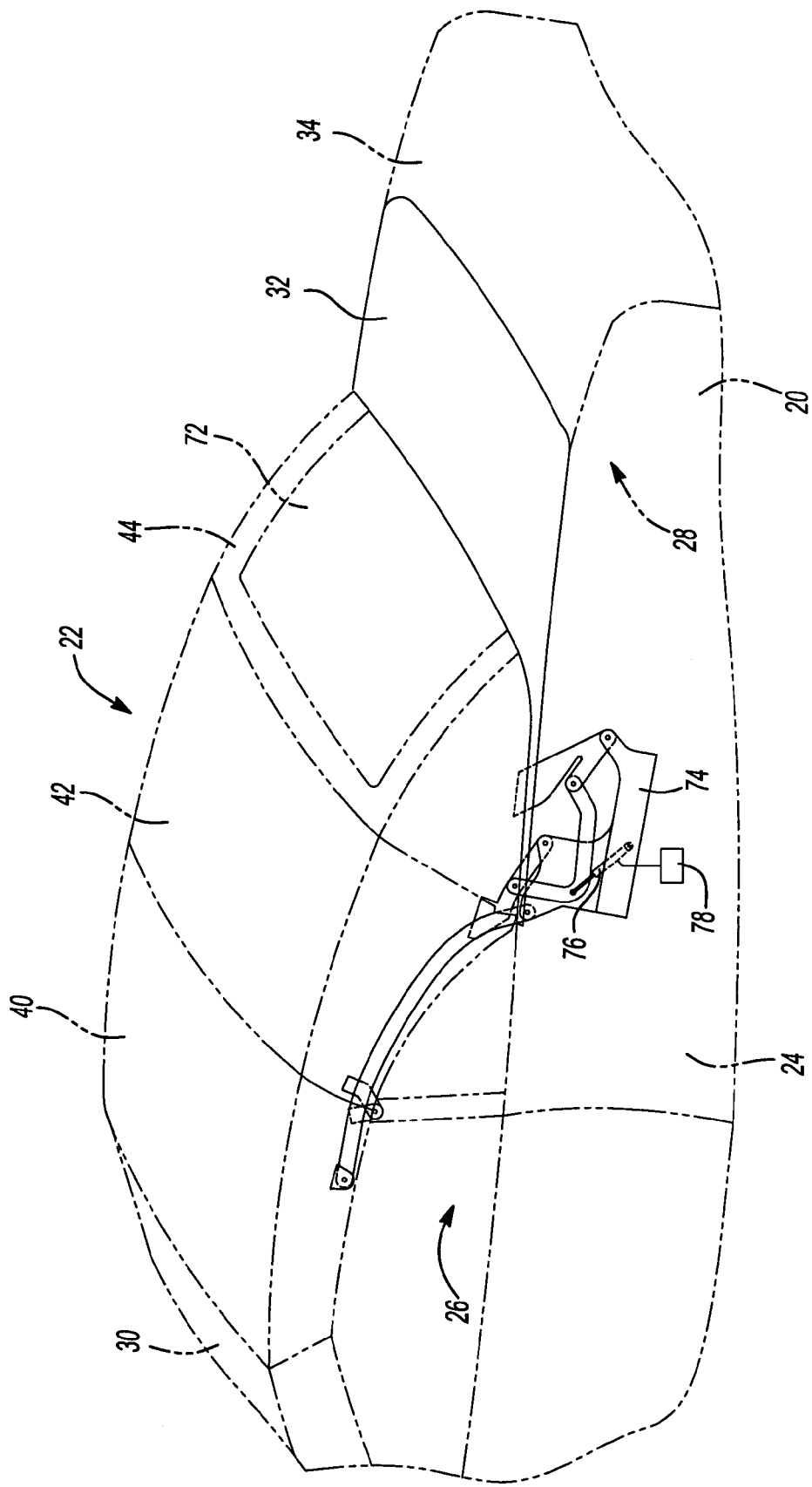
FIG. 1 is a partial perspective view of a convertible roof of the present invention in a raised position.

The present invention is described for illustration purposes embodied in a hydro-mechanically actuated three-piece convertible roof for an automotive vehicle. It will be appreciated, however, that the principals of the present invention are readily adaptable to a number of other devices which can retract or deploy a multi-section rooftop in a vehicle, including a soft top, or flexible fabric covered roof where the actuator or retraction mechanisms are coupled to side rails, or any combined hard and soft top roof.

With reference to FIG. 1–4, an exemplary automotive vehicle 20 includes a hardtop convertible roof 22 constructed in accordance with the teachings of the present invention. Vehicle 20 is constructed with a body 24 having a passenger compartment 26 and a storage area or trunk 28 aft of passenger compartment 26, and separated by a rear seat back cushion or metal seat back panel (not shown). Storage area 28 provides general storage in vehicle 20 along with stowing convertible roof 22 when in the retracted position.

Storage area 28 can be divided into a separate storage compartment (not shown) and a miscellaneous storage compartment (not shown) by placing a physical barrier in storage compartment 28 to separate it into two separate compartments. The physical barrier can be a fixed physical barrier that inhibits use of a storage compartment for anything other than storage of convertible roof 22 or can be a retractable barrier that can be lowered when convertible roof 22 is in the raised position to allow an entirety of storage area 28 to be utilized for storage. In the event of the use of the retractable barrier, it is preferred that a sensor be placed on the retractable barrier that prevents retraction of convertible roof 22 unless the retractable barrier is in its raised position. Passenger compartment 26 includes a windshield (not shown) and a header 30. Header 30 extends transversely across the top of the windshield. Storage area 28 is located behind passenger compartment 26.

Figure 2:
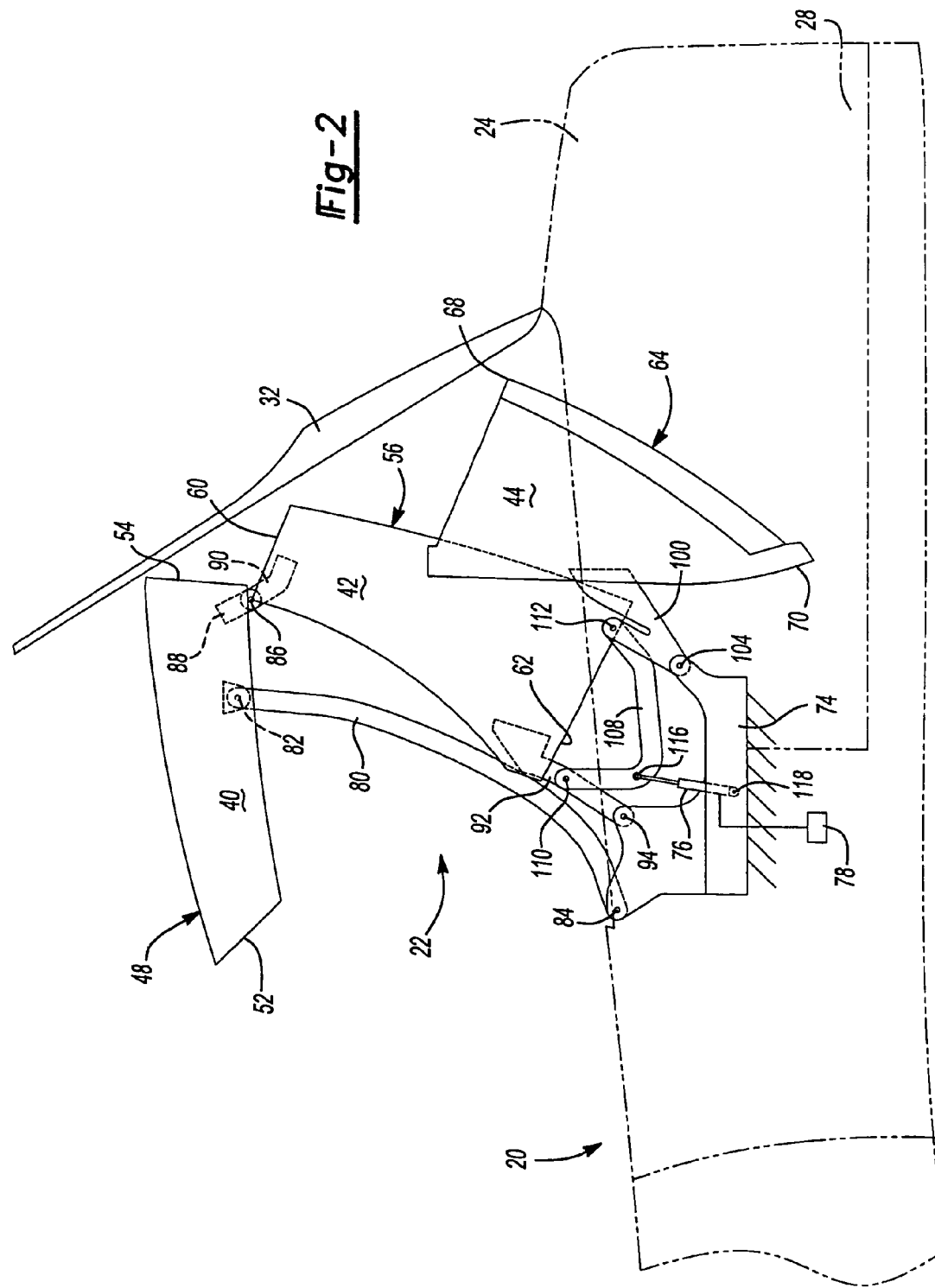
FIG. 2 is a partial side elevational view of the convertible roof of the present invention in an intermediate position.

Vehicle 20 includes a tonneau cover 32 and a trunk lid 34. Tonneau cover 32 is independent of trunk lid 34 and can be moved between closed and open positions, as shown in FIGS. 1 and 2 respectively, to allow retraction and extension of convertible roof 22 as described below. Similarly, trunk lid 34 can be operated independently of tonneau cover 32 and can move between open and closed positions (not shown) to allow access to storage area 28. Alternatively, vehicle 20 can be equipped with a dual acting deck lid (not shown) in place of the separate tonneau cover and trunk lid as shown. For example, tonneau cover 32 and trunk lid 34 can be replaced by a single two-way opening deck lid that opens in one direction to allow extension and retraction of convertible roof 22 and can be opened in an opposite direction to allow access to storage area 28 from a rear of vehicle 20. An example of such a two-way acting deck lid is disclosed in U.S. Pat. No. 5,823,606, entitled "Hard-Top Vehicle" issued to Schenk et al., the disclosure of which is incorporated by reference herein.

Convertible roof 22 includes a first or forwardmost roof section or panel 40, a second or intermediate roof section or panel 42 and a third or rearmost roof section or panel 44. Convertible roof 22 is moveable from a raised position depicted in FIG. 1 through intermediate positions such as positions depicted in FIGS. 2 and 3 to a stowed position depicted in FIG. 4. Each of the first, second, and third roof panels 40, 42, 44 are substantially rigid members interconnected to one another as described below.

Convertible roof 22 and the linkages interconnecting the various panels are shown symmetrical about a longitudinal, fore-and-aft centerline (not shown) of vehicle 20. Convertible roof 22 includes right and left roof linkages on the respective right and left sides of vehicle 20. For brevity, only one side of the convertible roof 22 and the associated linkages are discussed, however, it should be understood that opposite side linkages are also provided as part of convertible roof 22 and are mirror images of the side discussed. Also, when using the terms "fore", "aft", "front", "back", "forwardmost" and "rearmost" in describing components of convertible roof 22, such reference refers to the orientation of the components when convertible roof 22 is in the fully raised position.

First roof panel 40 is a substantially rigid panel having an outer or exterior surface 48, an inner or interior surface 50, a leading edge 52 and a trailing edge 54. First roof panel 40 includes a conventional latching mechanism (not shown) which is disengageably attachable with header 30 when convertible roof 22 is in the raised position. Leading edge 52 sealingly engages header 30 when the latching mechanism secures first roof panel 40 to header 30.

Second roof panel 42 is a substantially rigid panel having an outer or exterior surface 56, an inner or interior surface 58, a leading edge 60 and a trailing edge 62. The leading edge 60 sealing engages trailing edge 54 of first roof panel 40 when convertible roof 22 is in the raised position.

Third roof panel 44 is a substantially rigid panel having an outer or exterior surface 64, an inner or interior surface 66, a leading edge 68 and a trailing edge 70. Leading edge 68 sealingly engages trailing edge 62 of second roof panel 42 when convertible roof 22 is in the raised position. Trailing edge 70 includes a lip seal (not shown) which sealingly engages tonneau cover 32 when third roof panel 44 is in the raised position. Third roof panel 44 also includes a transparent window 72. Preferably window 72 is a three-dimensionally curved glass member matching the contour of the rear portion of third roof panel 44. Alternatively, window 72 may be a flexible transparent panel constructed from PVC or other suitable material.

Roof panels 40, 42, 44 are interconnected by a variety of linkages and through fixed pivots on a pair of brackets 74 which are fixedly connected to body 24 of vehicle 20, as described below. The interconnection of these panels 40, 42, 44 by the various linkages and pivots enables the retraction and extension of convertible roof 22 in a controlled manner through the use of a single actuator 76 on each side of convertible roof 22 which is controlled by an electronic control unit 78, such as a microprocessor, as described below.

One end of a balance link 80 is pivotally connected to first roof panel 40 at pivot 82 while an opposite end of balance link 80 is pivotally connected to bracket 74 at fixed pivot 84. First roof panel 40 is pivotally connected to second roof panel 42 at pivot 86. Specifically, an integral arm or extension 88 extending from inner surface 50 of first roof panel 40 is pivotally connected to an integral arm or extension 90 extending from inner surface 58 of second roof panel 42 at pivot 86. Arms 88, 90 do not move relative to their respective panels. Alternatively, arms 88, 90 could be separate links that are fixedly attached to their respective panels such that they do not move relative to their panel. Also alternatively, pivot 86 could be a hinge having a pair of clasps attached to both first and second roof panels 40, 42. Pivot 86 enables first roof panel 40 to rotate relative to second roof panel 42 when convertible roof 22 is being moved between raised and stowed positions as described below.

Second roof panel 42 has an integral arm or extension 92 that extends from the major or main portion of second panel 42. Arm 92 is an integral extension of second roof panel 42 such that arm 92 does not move relative to second roof panel 42. Alternatively, arm 92 can be a separate link that is fixedly attached to second roof panel 42 such that the separate link does not move relative to second roof panel 42 when convertible roof 22 is moving between raised and stowed positions. Arm 92 is pivotally connected to bracket 74 at fixed pivot 94. Second roof panel 42 is thereby connected to fixed pivot 94 and is limited to rotational movement about fixed pivot 94 when moving between the raised and stowed positions.

The interconnections between first and second roof panels 40, 42 form a four-bar linkage assembly that controls and coordinates the movement of first and second roof panels 40, 42 relative to one another. The four-bar linkage assembly includes balance link 80, first roof panel 40, second roof panel 42 and bracket 74 and is defined by pivots 82, 86, 94 and 84.

Third roof panel 44 has an integral arm or extension 100 that extends from the major or main portion of third roof panel 44 and is attached to bracket 74 at fixed pivot 104. Arm 100 does not move relative to third roof panel 44. Alternatively, arm 100 can be a separate link that is fixedly attached to third roof panel 44 such that the separate link does not move relative to third roof panel 44 when convertible roof 22 is moving between raised and stowed positions. The attachment of arm 100 to fixed pivot 104 limits movement of third roof panel 44 to rotational movement about fixed pivot 104 when convertible roof 22 moves between the raised and stowed positions. Third roof panel 44 is coupled to second roof panel 42 with a control link 108. One end of control link 108 is pivotally connected to arm 92 of second roof panel 42 at pivot 110. Pivot 110 is located on arm 92 between pivot 94 and the majority portion of second roof panel 42. The other end of control link 108 is pivotally connected to arm 100 of third roof panel 44 at pivot 112. Pivot 112 is located on arm 100 between pivot 104 and the majority portion of third roof panel 44. Control link 108 controls the movement of second and third roof panels 42, 44 relative to one another.

The interconnections between second and third roof panels 42, 44 form a four-bar linkage assembly that controls and coordinates the movement of roof panels 42, 44 relative to one another. The four-bar linkage assembly includes control link 108, third roof panel 44 (arm 100), bracket 74, and second roof panel 42 (arm 92) and is defined by pivots 112, 104, 94 and 110.

The interconnections between first and second roof panels 40, 42 and between second and third roof panels 42, 44 form a six-bar linkage assembly. The six-bar linkage assembly controls and coordinates the movement of first, second and third roof panels 40, 42, 44 relative to one another and, thus, the movement of convertible roof 22 between the raised and stowed positions. The six-bar linkage assembly includes balance link 80, first roof panel 40, second roof panel 42, control link 108, third roof panel 44 and bracket 74 and is defined by pivots 82, 86, 110, 112, 104 and 84.

Actuator 76 is attached to control link 108 at pivot 116 and also to bracket 74 at fixed pivot 118. Actuator 76 is operable to extend and retract in response to an input to cause convertible roof 22 to move between the raised and stowed positions via the six-bar linkage assembly. Preferably, actuator 76 is a pneumatic or hydraulic operating actuator. Accordingly, the six-bar linkage assembly allows the use of single actuator 76 on each side of convertible roof 22 to drive each roof panel in a coordinated manner relative to one another between the raised and stowed positions Tonneau cover 32 is pivotally coupled to body 24. Tonneau cover 32 can be operated by control unit 78 or by a separate control system (not shown) capable of moving tonneau cover 32 from a closed position depicted in FIG. 1 and 4 to an open position depicted in FIGS. 2 and 3. The control system functions to coordinate movement of tonneau cover 32 with convertible roof 22 such that storage area 28 is accessible when moving convertible roof 22 between the raised and stowed positions. Alternatively, tonneau cover 32 may be manually operated and selectively latched to body 24. As such, storage area 28 is selectively enclosed or accessible. The manually operated tonneau cover 32 would include a biasing mechanism such as a spring (not shown), for urging tonneau cover 32 toward the open position.

Devices such as limit switches, sensors and/or potentiometers are coupled to body 24, tonneau cover 32 and convertible roof 22 to inform electronic unit 78 of the position of tonneau cover 32 and convertible roof 22 (including the position of various linkages) to ensure that convertible roof 22 and tonneau cover 32 do not interfere with one another and that convertible roof 22 and actuator 76 are properly controlled to move between stowed and raised positions. An example of a suitable control system for a convertible roof 22 and/or tonneau cover 32 is that disclosed in U.S. Pat. No. 6,288,511 entitled "Automotive Convertible Top System" issued to Porter et al. and assigned to the assignee of the present invention, the disclosure of which is incorporated by reference herein.

Figure 3:
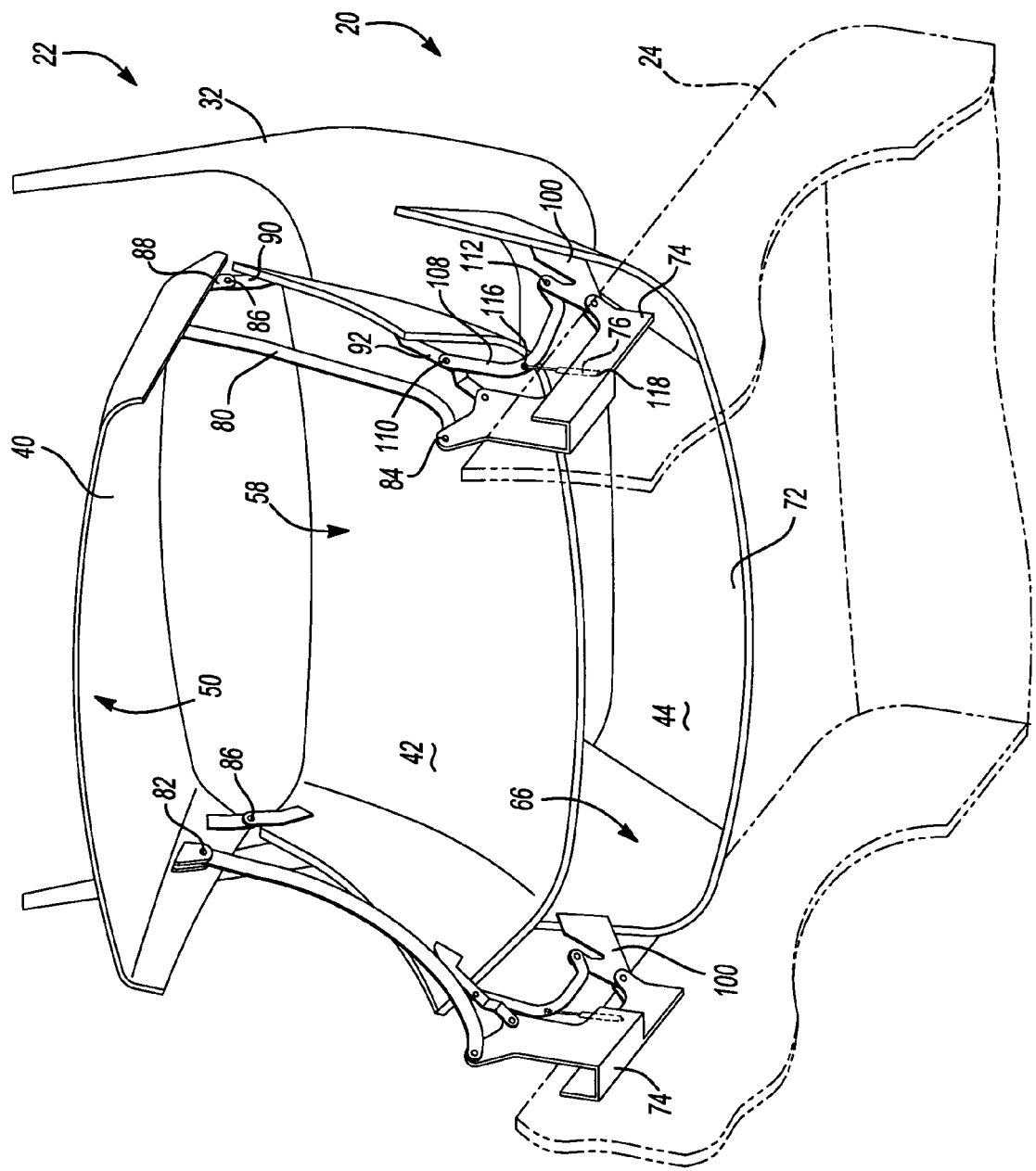
FIG. 3 is a partial perspective view of the convertible roof in an intermediate.
Figure 4:
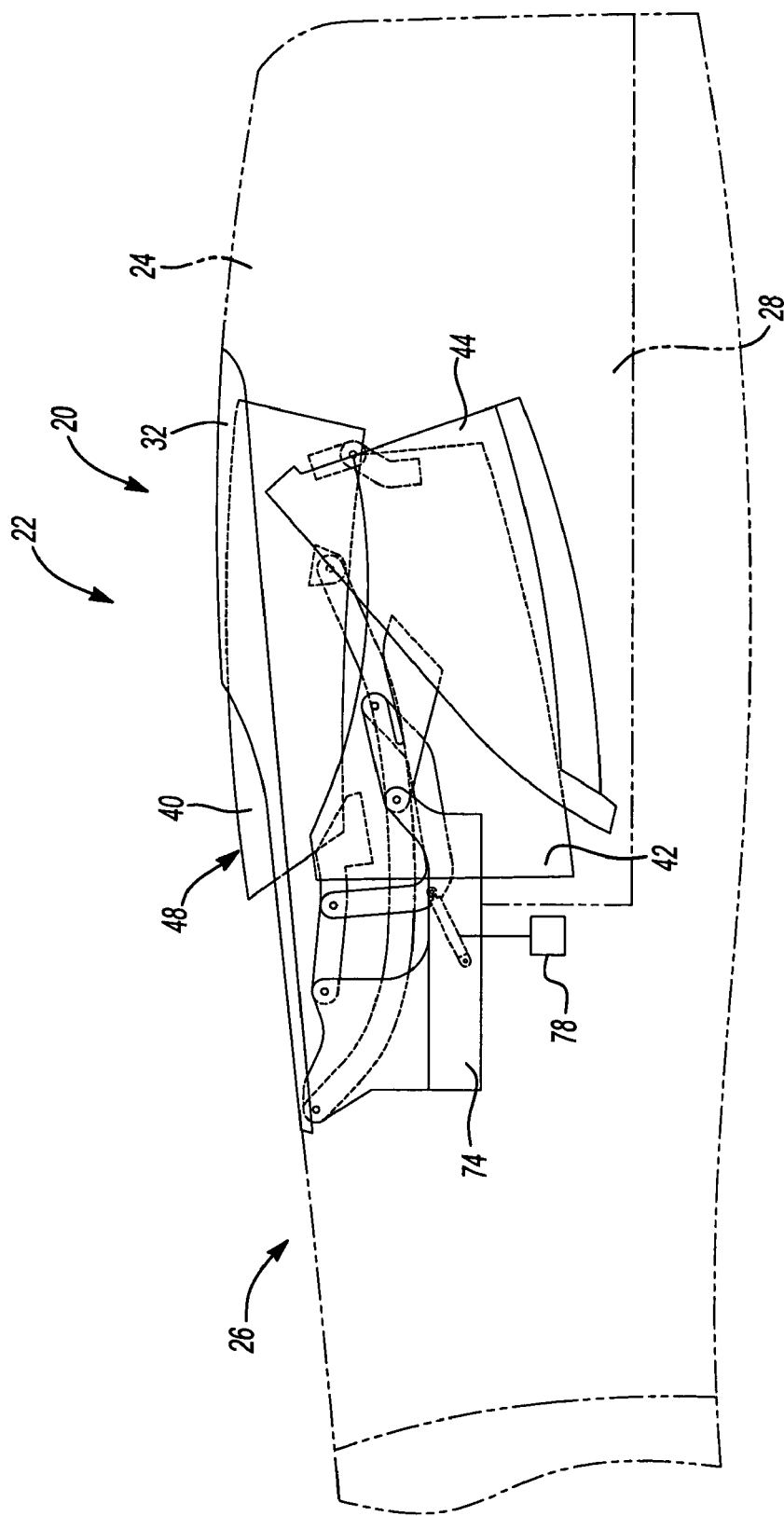
FIG. 4 is a partial side elevational view depicting the convertible roof of the present invention in a stowed position.

In operation, convertible roof 22 is moved from the raised position depicted in FIG. 1 through intermediate positions such as the ones depicted in FIGS. 2 and 3 to the stowed position depicted in FIG. 4 by first unlatching first roof panel 40 from header 42. An operator engages a switch (not shown) located in passenger compartment 26. The switch is electrically connected to control unit 78 to control the operation of convertible roof 22. When tonneau cover 32 is controlled by control unit 78, control unit 78 sends a signal causing tonneau cover 32 to move into the appropriate position to allow the desired movement of convertible roof 22. If a separate control system (not shown) is used to control operation of tonneau cover 32, the switch is also electrically connected to the separate control system to cause tonneau cover 32 to move to the appropriate position to allow the desired movement of convertible roof 22. When a manually operated tonneau cover 32 is utilized, control unit 78, through the use of proximity switches and/or sensors, detects the position of tonneau cover 32 to ensure it is in the proper position for the desired movement of convertible roof 22. Regardless of the system employed to control tonneau cover 32, once tonneau cover 32 is in an appropriate position to allow the desired movement of convertible roof 22, control unit 78 sends a signal to operate actuator 76.

Control unit 78 causes actuator 76 to perform the necessary movements to drive control link 108 to move convertible roof 22 from the raised position to the stowed position. As control link 108 is moved, second and third roof panels 42, 44 articulate about their respective fixed pivots 94, 104. As second roof panel 42 articulates, force is transferred through second roof panel 42 to first roof panel 40 via pivot 86. The force causes first roof panel 40 and second roof panel 42 to move. As depicted in FIGS. 2 and 3, first roof panel 40 pivots relative to second roof panel 42 in a clam shell manner such that inner surface 50 of first roof panel 40 approaches inner surface 58 of second roof panel 42. Thus, when moving from the raised to the stowed position, second roof panel 42 rotates rearwardly or clockwise (in the views depicted) about fixed pivot 94 and first roof section 48 rotates forwardly or counter clockwise (in the views depicted) relative to second roof panel 42 about pivot 86. Movement of control link 108 also moves third roof panel 44 about fixed pivot 104. As third roof panel 44 is moved from the raised to stowed position, third roof panel 44 rotates rearwardly or clockwise (in the views depicted) about a fixed pivot 104. As second and third roof panels 42, 44 are moved toward the stowed position, the panels nest together such that inner surface 66 of third roof panel 44 faces a majority of outer surface 56 of second roof panel 42. Once convertible roof 22 is fully retracted, tonneau cover 32 can move to its closed position as shown in FIG. 4.

With reference to FIG. 4, convertible roof 22 is shown in a stowed position. In the stowed position, first and second roof panels 40, 42 are each positioned in a substantially horizontal manner within storage area 28. First and second roof panels 40, 42 are positioned so that inner surface 50 of first roof panel 40 faces the inner surface 58 of second roof panel 42. In this position, first roof panel 40 covers a portion of second roof panel 42 to provide an aesthetically pleasing appearance. Furthermore, first roof panel 40 is positioned so that outer surface 48 faces outwardly from storage area 28. A portion of outer surface 48 of first roof panel 40 is positioned beneath tonneau cover 32 while a different portion of outer surface 48 of first roof panel 40 is exposed and visible from outside vehicle 20. Outer surface 48 and tonneau cover 32 are generally flush in order to provide an aesthetically pleasing appearance.

To move convertible roof 22 from the stowed position to the raised position, tonneau cover 32 is moved to its open position and control unit 78 causes actuator 76 to perform the necessary movements to cause control link 108 to move away from bracket 74 which in turn causes second and third roof panels 42, 44 to rotate forwardly or counter clockwise (in the views depicted) about their respective fixed pivots 94, 104. The articulation of second roof panel 42 transmits force to first roof panel 40 and causes first roof panel 40 to move forwardly and pivot clockwise (in the views depicted) relative to second roof panel 42 about pivot 86 and causes convertible roof 22 to move from the retracted position to the raised position.

While it is apparent that the embodiments of the invention disclosed are well calculated to provide the advantageous and features above stated, it will be appreciated that the invention is susceptible to modification, variation and change without departing from the proper scope or fair meaning of the subsequent claims. For example, the convertible roof may include extra roof panels or additional members or linkages. A soft-top roof may also be used with the present device although various advantages of the present invention may not be achieved. While the system was described to include a hydraulic or pneumatic actuator, and electric motor or other suitable automatically powered transfer mechanism may alternatively be employed to deploy convertible roof 22. Other materials and dimensions can be substituted for those disclosed. It is intended by the following claims to cover these and any other departures from the disclosed embodiment which follow to the true spirit of this invention.

What is claimed is:

1. An automotive vehicle convertible roof comprising:
   at least three substantially rigid roof panels each moveable from a raised position to a stowed position; and
   a single pair of mounting brackets operable to be fixedly connected to and positioned on opposite sides of the vehicle,
   wherein each of said roof panels is pivotally connected to said pair of brackets with each roof panel rearward of a forwardmost roof panel being directly pivotally connected to said brackets and a forwardmost two of said roof panels are directly pivotally connected together.

2. An automotive vehicle convertible roof comprising:
   at least three substantially rigid roof panels each moveable from a raised position to a stowed position; and
   a single pair of mounting brackets operable to be fixedly connected to and positioned on opposite sides of the vehicle,
   wherein each of said roof panels is pivotally connected to said pair of brackets with each roof panel rearward of a forwardmost roof panel being directly pivotally connected to said brackets and interior surfaces of a forwardmost two of said roof panels face one another when in said stowed position.

3. The convertible roof of claim 2, wherein an exterior surface of a forwardmost roof panel faces upwardly when in said stowed position.

4. An automotive vehicle convertible roof comprising:
   at least three substantially rigid roof panels each moveable from a raised position to a stowed position; and
   a single pair of mounting brackets operable to be fixedly connected to and positioned on opposite sides of the vehicle,
   wherein each of said roof panels is pivotally connected to said pair of brackets with each roof panel rearward of a forwardmost roof panel being directly pivotally connected to said brackets and said forwardmost roof panel is pivotally connected to said brackets with a single pair of moveable links with each link directly coupled to said forwardmost roof panel and to said brackets.

5. The convertible roof of claim 4, wherein said forwardmost two of said roof panels, said pair of moveable links and said brackets define a pair of at least four-bar linkages.

6. The convertible roof of claim 1, wherein a rearwardmost two of said roof panels and said brackets define a portion of a pair of at least four-bar linkages.

7. An automotive vehicle convertible roof comprising:
   at least three substantially rigid roof panels each moveable from a raised position to a stowed position;
   a single pair of mounting brackets operable to be fixedly connected to and positioned on opposite sides of the vehicle;
   an actuator operable to move said roof panels between said raised and stowed positions,
   wherein each of said roof panels is pivotally connected to said pair of brackets with each roof panel rearward of a forwardmost roof panel being directly pivotally connected to said brackets and said actuator drives a link connecting a rearwardmost two of said roof panels.

8. A convertible roof for a vehicle, the convertible roof comprising:
   at least three substantially rigid roof panel assemblies each moveable from a raised position to a stowed position;
   a rearmost two roof panel assemblies each being directly pivotally connected to fixed locations relative to the vehicle; and
   a movable link pivotally connected to said rearmost two roof panel assemblies and forming an at least four-bar linkage with said rearmost two roof panel assemblies and said fixed locations,
   said moveable link being pivotally connected to portions of said rearmost two roof panel assemblies that extend between said fixed locations and a leading edge of said rearmost two roof panel assemblies.

9. The convertible roof of claim 8, wherein a forwardmost of said at least three roof panel assemblies is directly pivotally connected to one of said rearmost two roof panel assemblies.

10. The convertible roof of claim 9, wherein said moveable link is a first moveable link and said forwardmost roof panel assembly is pivotally connected to a fixed location on the vehicle with a second moveable link and defines a portion of an at least four-bar linkage with said one of said rearmost two roof panel assemblies and said second moveable link.

11. The convertible roof of claim 8, further comprising an actuator directly connected to said moveable link and operable to move said roof panel assemblies between said raised and stowed positions.

12. The convertible roof of claim 8, wherein an exterior surface of a forwardmost of said at least three roof panel assemblies faces upwardly when in said stowed position.

13. An automotive vehicle convertible roof comprising:
   at least three substantially rigid roof panels each moveable from a raised position to a stowed position;
   a moveable link directly pivotally connected to a rearmost two of said roof panels and forming a portion of an at least four-bar linkage with said rearmost two roof panels; and
   an actuator operable to move said roof panels between said raised and stowed positions, wherein
   said actuator is directly pivotally connected to said moveable link.

14. The convertible roof of claim 13, wherein each of said rearmost two roof panels is directly pivotally connected to fixed locations relative to the vehicle.

15. The convertible roof of claim 14, wherein said moveable link is a first moveable link and a forwardmost of said at least three roof panels is pivotally connected to a fixed location relative to the vehicle with a second moveable link.

16. The convertible roof of claim 13, wherein a forwardmost of said at least three roof panels is directly pivotally connected to one of said rearmost two roof panels.

17. The convertible roof of claim 16, wherein said forwardmost roof panel is coupled to and forms a portion of a four-bar linkage with said one of said rearmost roof panels.

18. The convertible roof of claim 13, wherein said at least four-bar linkage is a four-bar linkage.

19. The convertible roof of claim 13, wherein an exterior surface of a forwardmost of said at least three roof panels faces upward when in said stowed position.

20. The convertible roof of claim 13, wherein interior surfaces of a forwardmost two of said at least three roof panels face one another when in said stowed position.

* * * * *

UNITED STATES PATENT AND TRADEMARK OFFICE
CERTIFICATE OF CORRECTION

| | | |
|---|---|---|
| PATENT NO. | : 7,063,371 B2 | Page 1 of 1 |
| APPLICATION NO. | : 10/800118 | |
| DATED | : June 20, 2006 | |
| INVENTOR(S) | : Michael T. Willard | |

It is certified that error appears in the above-identified patent and that said Letters Patent is hereby corrected as shown below:

TITLE PAGE, No. (56), References Cited, Other Publications, Page 4, column 1, reference No. 17, "benn" should be --been--.

TITLE PAGE, No. (56), References Cited, Other Publications, page 4, column 2, reference No. 5, "102001" should be --10/2001--.

Signed and Sealed this

Third Day of April, 2007

JON W. DUDAS
*Director of the United States Patent and Trademark Office*